Aug. 23, 1966   O. A. NANCE   3,268,432
TREATMENT OF HYDROCARBONS WITH SHOCK WAVES
Filed Oct. 31, 1960   2 Sheets-Sheet 1

INVENTOR
OLEN A. NANCE
BY Donald W Canady
ATTORNEY

Aug. 23, 1966 O. A. NANCE 3,268,432
TREATMENT OF HYDROCARBONS WITH SHOCK WAVES
Filed Oct. 31, 1960 2 Sheets-Sheet 2
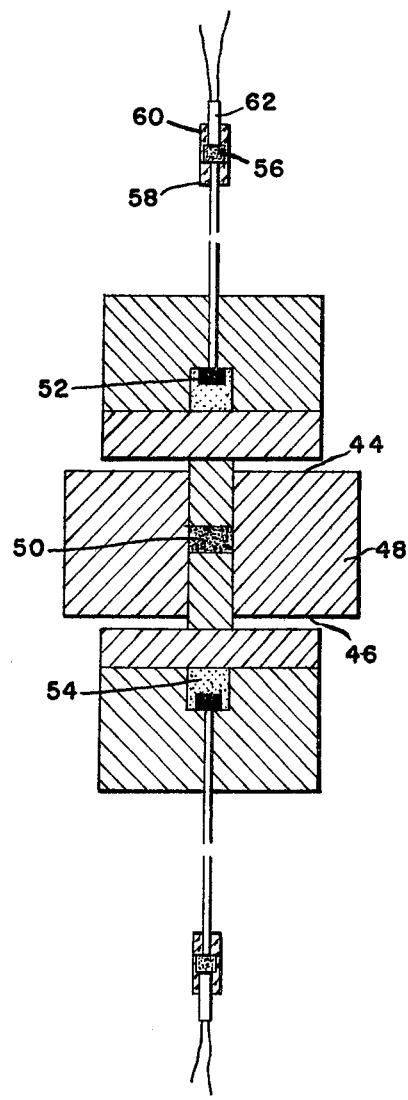
Fig. No. 3
INVENTOR
OLEN A. NANCE

United States Patent Office 3,268,432
Patented August 23, 1966

3,268,432
TREATMENT OF HYDROCARBONS WITH
SHOCK WAVES
Olen A. Nance, Woodland Hills, Calif., assignor to Richfield Oil Corporation, Los Angeles, Calif., a corporation of Delaware
Filed Oct. 31, 1960, Ser. No. 66,345
2 Claims. (Cl. 204—162)

This invention which is a continuation-in-part of my application Serial No. 34,776, filed June 6, 1960 (now abandoned), relates to a method for supplying the activation energy for the chemical reaction of hydrocarbons and more particularly relates to the utilization of shock waves to induce chemical reactions in hydrocarbons in the condensed phase, i.e., the liquid phase or solid phase.

In the usual method of thermal activation the translational energy given to the reactant molecules is distributed in the Maxwell Boltmann distribution and only a small fraction of the molecules have sufficient translational energy to successfully effect activation. In the shock activation all the molecules are given more nearly the same translational energy (in the direction of shock propagation) by the shock and therefore for the same total energy as in the thermal activation on the average have higher probability of reacting.

It is an object of my present invention to provide a process for introducing activation energy into a reactant material by means of a shock wave.

It is a further object of my invention to provide a process for cracking hydrocarbons in the condensed phase by introducing activation energy into the hydrocarbon reactant materials by shock.

Other objects and a more complete understanding of my invention may be realized by reference to the following specification and the appended claims taken in conjunction with the drawings, in which:

FIGURE 3 shows a modification of the test cylinder shown in FIGURE 2, employing a double piston press.

Figure 1:
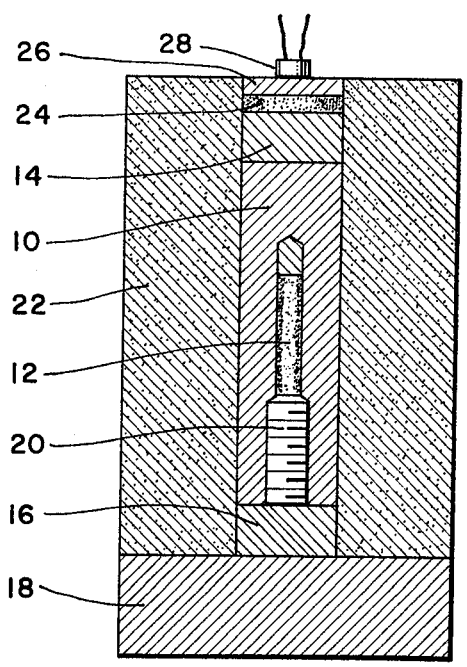
FIGURE 1 shows in sectional elevation, a test cylinder and means for generating a shock wave therein.

My invention is based on the discovery that it is possible to employ the special properties of organic materials in solid and liquid phases together with energy characteristic of shock waves to bring about useful chemical reactions of various types. Reactions similar to those used in the cracking of petroleum and other reactions wherein chemical bonds are activated to effect a reaction, may be induced by subjecting the reactants to shock waves under certain prescribed conditions. The small free space in the compressed or condensed state restricts or prohibits the diffusion of both reactants and products. In the treatment of a gas phase most of the energy from a shock wave takes the form of translational energy gas phase collisions, whereas in the compressed or condensed phases the intermolecular energy transfer takes place with a characteristic period related to crystalline vibration frequencies. Chemical reactions involving the absorption of vibrational energy are advantageously conducted in the condensed phases since the energy of reaction will be confined to, or drawn from, a volume comparable to atomic or molecular dimensions.

A shock wave is characterized by a very sharp change in pressure at the boundary between the undisturbed material and the advancing shock. The pressure profile behind this front depends on the way in which the shock was generated and the nature of the material through which it progresses. The shock waves utilized in the present invention are generated through any mechanism which applies energy to a limited region of the material in a time short compared to the time required for a sound wave to propagate through a comparable thickness of that material; for example, by mechanical impact, electric discharge, chemical reactions including dynamite and other high explosives, and nuclear reactions of which the atomic bomb is a prime example.

It is hypothesized that when the shock wave engulfs the reactant material the material is compressed extremely rapidly and an appreciable fraction of work done in compression of this material appears as energy in that material in two ways which may effect chemical reaction. First, it appears as a mechanical disturbance which may cause chemical reaction to occur. Second, it causes a temperature rise which promotes and/or accelerates chemical reaction. The first of these effects depends primarily on the rate of rise of pressure. By this effect sufficient vibrational energy may be transmitted to the intra molecular structure to activate or break chemical bonds and thus "crack" the subjected material. The second will, by rough analogy to ordinary chemical reactions, depend on the time during which this pressure persists, the thermal conductivity of the materials in the reaction zone and the energy release or absorption by the chemical processes. With regards to the shock cracking mechanism, my present invention is based upon the recognition that the activation and rate controlling processes are quantitatively and perhaps qualitatively unlike the conventional cracking processes.

In the compressed state characteristic of the shock, (1) the intermolecular energy transfer takes place with a characteristic period related to crystalline vibration frequencies rather than gas phase collisions; (2) the intra molecular energy transfer occurs at rates characteristic of bond vibration frequencies; (3) the "entropy of activation" will be related to the molecular packing rather than the more random effects of gas phase collisions; (4) the small free space restricts or prohibits the diffusion of both reactants and products; (5) to an unusual degree, the energy of reactions will be confined to, or drawn from, a volume comparable to atomic or molecular dimensions.

Except for phase changes in crystals and alloys, which is a physical rather than a chemical change, little or no work has heretofore been done on shock induced reactions and prior work was devoted to gas phase reactions.

Practical applications of my invention include the cracking of petroliferous materials in the condensed phase and the polymerization of olefinic hydrocarbons. The term "cracking" is used in its broad sense to mean the breaking of carbon-carbon bonds.

The reactions will depend upon the nature of the condensed phase, its original temperature and pressure, the pressure and duration of the shock. Therefore, the specific pressure, time and other factors can be adjusted to optimize the desired reactions.

In order for a shock wave to effect a chemical reaction in a material, a minimum pressure must be exerted on the material. A shock wave intensity of one kilobar is that force which will cause to be exerted a pressure of 1000 atmospheres on the material. It has been found that pressures as low as 1 kilobar might effect a degree of cracking but that a more practical range is from 10 to 250 kilobars, preferably 40 to 200. In petroliferous mixtures, pressures greater than 250 kilobars with a pressure duration of 1 to 10 microseconds can be proven to have marked chemical effects on the petroleum. Similar chemical effects can be expected to occur at lower pressures but the pressure boundaries depend on the specific petroleum mixture and exact values must be established by experiment. When a petroliferous sample was treated at pressures above 250 kilobars, it was found that coking occurred indicating a practical upper limit for this material under the test conditions. On the other hand, some hydrogen and methane were evidenced at 10 kilobars, indicating some cracking. The shock residence time is an important factor in that lower pressures of relatively long duration may have a similar cracking effect as higher pressures of relatively short duration. Thus due to the longer shock residence time of shock waves created by a nuclear reaction, it would be expected that a relatively large volume could be subjected to a lesser pressure for a sufficient duration to effect chemical reactions such as cracking.

The material to be treated with a shock wave may be contained in a suitable containing vessel. If a container is utilized, it is possible to take advantage of the container walls or its geometry to modify or augment the effects of the shock.

The examples below, which serve to illustrate the effectiveness of my invention for inducing chemical reactions with shock waves were performed in one of the apparatus shown in the drawings. In FIGURE 1, the cylinder 10 containing the sample 12, is equipped at both ends with abutting metal walls or discs 14 and 16 and a metal base 18, all of which serve as momentum traps and thus prevent spalling of the sample holder 10. A threaded plug 20 seals the sample in the test cylinder. The explosive mixture in the form of a thick cylindrical shell 22 was used so that relief from high pressure would be gradual enough not to tear the test cylinder 10 apart by elastic rebound. A layer of sand 24 and a layer of explosive 26 overlie the top of disc 14 and support the detonator 28.

Figure 2:
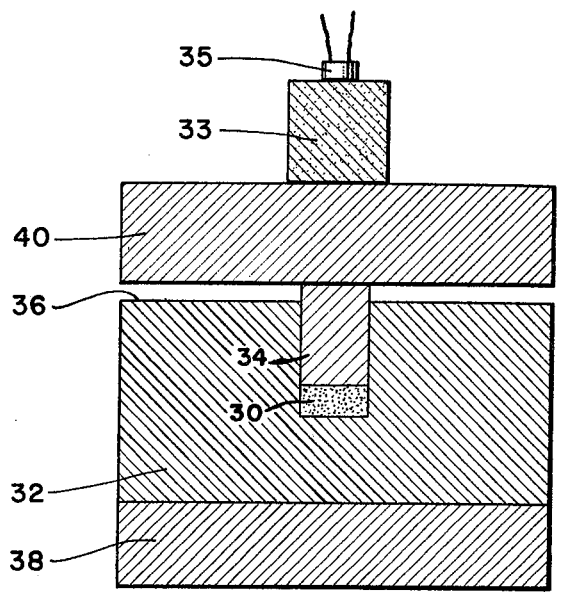
FIGURE 2 shows in sectional elevation, a modified test cylinder with means for generating a shock wave therein.

A modification of the container geometry is shown in FIGURE 2 where a sample 30 is contained in a vessel 32. On detonation of the explosive charge 33 with detonation 35 a pressure pulse of peak pressure 100 kilobars for a duration of about 5 micro-seconds passed through the sample. Momentum traps 38 and 40 served to prevent container 32 from spalling when explosive charge 33 is detonated with detonator 35. The apparatus is sealed gas tight at the instant of explosion by the piston 34 swelling and sealing against the cylinder wall 36 of test vessel 32.

The sample may be recovered after the shock treatment by placing the vessel in a pressure tight box (not shown), and evacuating air from the box to a high vacuum. A drill passing through a pressure tight seal in the box may be used to drill into the sample container. This allows the sample, gases, and vapors to escape into the pressure tight box. These gases and vapors may be removed into an evacuated sample tube (not shown) and analyzed by mass spectrometry and gas-liquid partition chromatography.

FIGURE 3 shows a modification of the apparatus shown in FIGURE 2 wherein a two piston explosive press is employed having two pistons 44 and 46 positioned in vessel 48 to seal the sample 50 therein upon detonation of the explosive charges 52 and 54. The explosives are detonated simultaneously with an RDX booster 56 positioned between two lucite adapters 58 and 60 which are detonated with precision detonator 62.

*Example I*

A 150 gram sample of hydrocarbons of largely cyclic saturated structure having an average molecular weight of 685 and sand was subjected to a shock loading by exploding 4554 grams of a mixture of 53.5% C–3 (an explosive compound containing 79% cyclotrimethylene trinitrame (RDX) and 21% explosive plasticizer) and 46.5% table salt with a detonation velocity of 5.65 mm./microsecond, in the container geometry shown in FIGURE 1. The pressure was calculated to be 200–250 kilobars at a duration of 8 microseconds. The maximum pressures were behind a Mach disc (pressure or shock zone) dragged through the sample at the velocity of detonation of the explosive used. These maximum pressures can be readily determined from the detonation velocity of the explosive used and the equation of state of the hydrocarbon-sand mixture. The minimum pressure behind the conveying waves in the unknown fraction of sample not affected by the Mach disc is calculated by multiplying the contact pressure of the explosive used by a factor between one and the ratio of outer radius to inner radius of the containing vessel. The factor used was two.

The experiment was performed by treating the hydrocarbon sample in a cylinder 10 as shown in FIGURE 1.

The sample was recovered by cutting into the bolt about ¼ inch above the sample and unscrewing the top and bolt from the remaining sample cylinder. When the top was unscrewed, a gas, probably hydrogen and methane, escaped. The sample was changed in appearance, being less viscous, and smelled like a high-sulfur crude oil. Spectrographic analysis showed the formation of gas and a ten-fold enrichment of aromatics in the $C_9$ molecular weight range.

*Example II*

A sample similar to that of Example I was subjected to a shock wave in the pressure range of 400–650 kilobars at a duration of 8 microseconds in the container geometry of FIGURE 1. The sample was recovered by cutting off both ends of the sample cylinder on a lathe. As on all shots where cutting had to be done, a cooling spray was used to prevent heating of the container which could affect the sample. The sample was a completely dry, compressed, fine black dust. Evidently the hydrocarbons had been completely cracked and gases had escaped, leaving only carbon and powdered sand in the cylinder.

*Examples III, IV*

In Examples III and IV a viscous oil-sand containing 1.35 grams and 1.32 grams of oil respectively, was subjected to a peak shock pressure loading of 70 kilobars as calculated by the method referred to in Example I. The time of the pressure pulse was approximately 7 microseconds. Analysis of the shock treated oil-sands of Examples II and IV are shown in Tables I and II respectively.

*Examples V, VI*

The experiment of Examples III and IV were repeated on separated oil and the results thereof are shown in Tables III and IV respectively. Examples III through VI were conducted in the apparatus shown in FIGURE 3.

TABLE I.—ANALYSIS OF PRODUCTS FROM EXAMPLE III

Loaded: 11.36 g. oil-sand, containing 1.35 g. oil.
Recovered: 1.02 g. oil plus the following:
  Noncondensibles: Total 0.3 cc.

$H_2$ ------------------------------- 3.3
    $C_1$ ------------------------------- 0.7
    $C_3$ ------------------------------- 0.6
    $n-C_4$ ----------------------------- 0.8
    $N_2$ ------------------------------- 62.1
    Air -------------------------------- 32.3
  −195° C. Condensibles: Total 2.5 mg. (amount recovered).
    $C_3^=$ ----------------------------- 0.7
    $n-C_4$ ----------------------------- 1.1
    $n-C_5$ ----------------------------- 67.6
    $i-C_5$ ----------------------------- 10.3
    $C_5^=$ ----------------------------- 0.7
    $C_6^+$ ----------------------------- 1.0
    $\phi CH_3$ ------------------------- 0.2
    $CO_2$ ------------------------------ 5.2
  −80° C. Condensibles: Total 3.0 mg.; 2.4 mg. water +0.6 mg. of the following:
    $C_3^=$ ----------------------------- 6.9
    $n-C_4$ ----------------------------- 1.1
    $n-C_5$ ----------------------------- 52.8
    $C_5^=$ ----------------------------- 0.8
    $C_6^+$ ----------------------------- 5.6
    $\phi CH_3$ ------------------------- 0.0
    $N_2$ ------------------------------- 2.5
    $CO_2$ ------------------------------ 1.5

TABLE II.—ANALYSIS OF PRODUCTS FROM EXAMPLE IV

Loaded: 11.10 g. oil-sand, containing 1.32 g. oil.
Recovered: 0.84 g. oil plus the following:

Noncondensibles: Total 0.16 cc.

| | |
|---|---|
| $H_2$ | 3.6 |
| $C_1$ | 0.4 |
| $C_2$ | 0.5 |
| $C_3$ | 0.5 |
| $N_2$ | 7.8 |
| Air | 87.6 |

—195° C. Condensibles: Total 1.1 mg.

| | |
|---|---|
| $C_3$ | 14.6 |
| $i$-$C_4$ | 0.5 |
| $n$-$C_4$ | 1.1 |
| $i$-$C_5$ | 14.8 |
| $n$-$C_5$ | 54.1 |
| $C_5^=$ | 0.7 |
| $CO_2$ | 11.7 |

—80° C. Condensibles: Total, 1.0 mg. $H_2O$ plus approx. 0.05 mg. of the following:

| | |
|---|---|
| $i$-$C_5$ | 17.8 |
| $n$-$C_5$ | 44.0 |
| $C_5^=$ | 1.4 |
| $\phi CH_3$ | 10.6 |
| $CO_2$ | 4.2 |

TABLE III.—ANALYSIS OF PRODUCTS FROM EXAMPLE V

| | |
|---|---|
| Loaded | 6.59 g. separated oil. |
| Recovered | 6.32 g. oil plus the following. |
| Noncondensibles | Total 34 cc. at S.T.P. Sample almost all air, with traces of $H_2S$, $SO_2$, $H_2$, $\phi CH_3$, and other hydrocarbons.[1] |
| —195° C. Condensibles | Small amount of $H_2O$ and $\phi CH_3$. |
| —80° C. Condensibles | Total 11.1 mg. $\phi CH_3$–16%. |

[1] Air leak occurred during drilling of press to remove sample.

TABLE IV.—ANALYSIS OF PRODUCTS FROM EXAMPLE VI

Loaded: 6.66 g. separated oil.
Recovered: 6.33 oil plus the following:

Noncondensibles: Total 41 cc. All air, except 0.33 cc. $H_2$.

—195° C. Condensibles: Total 4.3 mg.

| | |
|---|---|
| $C_3^=$ | 5.0 |
| $i$-$C_4$ | 0.2 |
| $n$-$C_5$ | 46.3 |
| $C_5^=$ | 9.1 |
| $C_5^=$ | 0.3 |
| $CH_2Cl_2$* | 32.3 |

—80° C. Condensibles: Total 1.1 mg.

| | |
|---|---|
| $C_3^=$ | 15.6 |
| $i$-$C_4$ | 1.1 |
| $C_4^=$ | 2.6 |
| $n$-$C_5$ | 30.3 |
| $i$-$C_5$ | 4.3 |
| $\phi CH_3$ | 0.4 |
| $CH_2Cl_2$* | 45.4 |

\* Methylene chloride was used as oil solvent.

I claim:
1. A process for cracking hydrocarbon materials in the condensed phase consisting essentially of subjecting said materials to a shock wave whereby said cracking results from an increase in vibrational energy transmitted to said condensed hydrocarbon by said shock wave having an intensity of from about 10 to 250 kilobars.
2. The process of claim 1 wherein the intensity of said shock wave is from 40 to 200 kilobars.

References Cited by the Examiner

UNITED STATES PATENTS

| | | | |
|---|---|---|---|
| 2,738,172 | 3/1956 | Spiess et al. | 204—154 |
| 2,745,861 | 5/1956 | Bodine | 204—154 |
| 2,878,177 | 3/1959 | Kroepelin et al. | 204—172 |
| 2,901,320 | 8/1959 | Haller | 204—154 |
| 2,983,661 | 5/1961 | Lauer | 204—154 |
| 2,986,505 | 5/1961 | Lauer et al. | 204—156 |
| 3,087,840 | 4/1963 | Shaw | 134—1 |

FOREIGN PATENTS 823,231  10/1937  France.

OTHER REFERENCES

Fairbairn et al.: Proceedings Royal Society, vol. A239, 1957, pp. 464–475.

Skinner et al.: Journal Physical Chem., vol. 63 October 1959, pp. 1736–42.

Skinner et al.: Journal Physical Chem., vol. 64, August 1960, pp. 1025–1028, 1028–1031.

JOHN H. MACK, *Primary Examiner.*

JOHN R. SPECK, MURRAY TILLMAN, WINSTON A. DOUGLAS, *Examiners.*

H. S. WILLIAMS, *Assistant Examiner.*